(12) United States Patent
Gustafson et al.

(10) Patent No.: US 8,267,168 B2
(45) Date of Patent: Sep. 18, 2012

(54) REGULATOR DAMPENING DEVICE AND METHOD

(75) Inventors: Ryan Gustafson, Cypress, TX (US); Salvador Reyes, Houston, TX (US); Perrin Rodriguez, Cypress, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 484 days.

(21) Appl. No.: 12/625,777

(22) Filed: Nov. 25, 2009

(65) Prior Publication Data
US 2011/0120698 A1   May 26, 2011

(51) Int. Cl.
*E21B 34/02* (2006.01)
*E21B 33/06* (2006.01)
*F16L 55/04* (2006.01)
*F16K 31/12* (2006.01)

(52) U.S. Cl. .................. 166/86.2; 166/363; 137/505.18; 137/505.38; 251/1.3

(58) Field of Classification Search ................. 166/85.4, 166/86.1, 86.2, 363, 364, 361, 368, 337; 137/505.18, 505.38; 251/1.1, 1.3; 138/46
See application file for complete search history.

(56) References Cited

U.S. PATENT DOCUMENTS
5,141,028 A * 8/1992 Cohen .................. 137/625.3
* cited by examiner

*Primary Examiner* — Shane Bomar
*Assistant Examiner* — Robert E Fuller
(74) *Attorney, Agent, or Firm* — Potomac Patent Group PLLC

(57) ABSTRACT

A flow regulator includes a flow regulating part configured to receive at an inlet a working fluid at a first pressure and to release the working fluid at an outlet at a second pressure; a slide provided inside the flow regulating part and configured to move along an axis to reduce the pressure of the working fluid; a control part attached to the flow regulating part, the control part including a chamber; a spring housing provided in the chamber and connected to the slide though a shaft, the spring housing configured to move the slide along the axis; a cap provided in the chamber and facing the spring housing, the cap being configured to have plural blind holes; and plural pins extending along the axis and attached to the spring housing, the plural pins being configured to enter the plural blind holes.

20 Claims, 7 Drawing Sheets

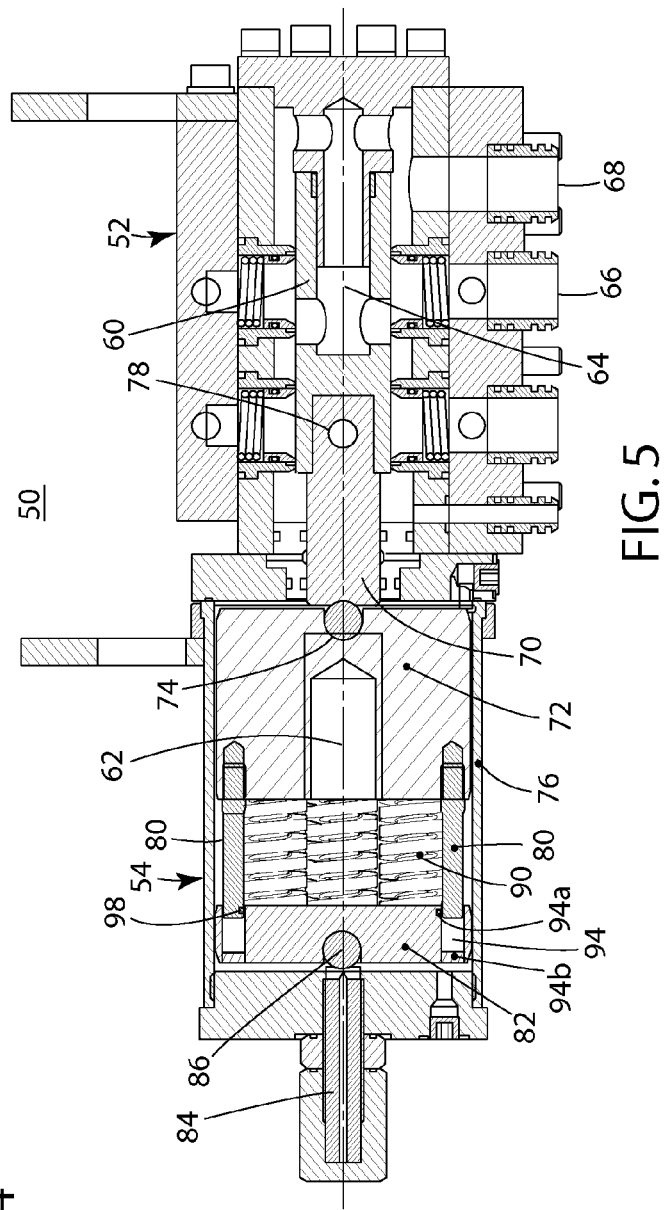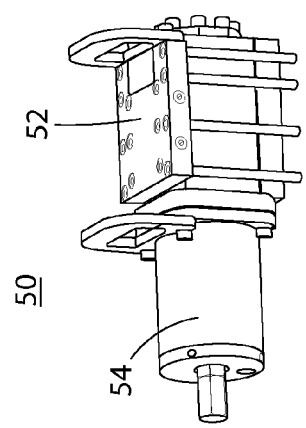
FIG. 4
FIG. 5

REGULATOR DAMPENING DEVICE AND METHOD

BACKGROUND

1. Technical Field

Embodiments of the subject matter disclosed herein generally relate to methods and devices and, more particularly, to mechanisms and techniques for dampening a motion of a part of a regulator.

2. Discussion of the Background

A blowout preventer (BOP) is a safety mechanism that is used at a wellhead of an oil or gas well. The BOP may be used for offshore drilling and also for land-based drilling. The BOP is configured to shut off the flow from the well when necessary. One such event may be the uncontrolled flow of gas, oil or other well fluids from an underground formation into the well. Such event is sometimes referred to as a "kick" or a "blowout" and may occur when formation pressure exceeds the pressure applied to it by the column of drilling fluid. This event is unforeseeable and if no measures are taken to control it, the well and/or the associated equipment may be damaged.

Another event that may damage the well and/or the associated equipment is a hurricane or an earthquake. Both of these natural phenomena may damage the integrity of the well and the associated equipment. For example, due to the high winds produced by a hurricane at the surface of the sea, the vessel or the rig that powers the undersea equipment may start to drift, requiring the disconnection of the power/communication cords or other elements that connect the well to the vessel or rig. Other events that may damage the integrity of the well and/or associated equipment are possible as would be appreciated by those skilled in the art.

Thus, the BOP may be installed on top of the wellhead to seal it in case that one of the above events threatens the integrity of the well. The BOP is conventionally implemented as a valve to prevent and/or control the release of pressure either in the annular space between the casing and the drill pipe or in the open hole (i.e., hole with no drill pipe) during drilling or completion operations.

FIG. 1 shows a well 10 that is drilled undersea. A wellhead 12 of the well 10 is fixed to the seabed 14. A BOP 16 is secured to the wellhead 12. The BOP may be a ram block BOP, a blind BOP, etc. Ram-type BOPS typically include a body and at least two oppositely disposed bonnets. The bonnets partially house a pair of ram blocks. The ram blocks may be closed or opened with pressurized hydraulic fluid to seal the well.

FIG. 1 shows, for clarity, the ram BOP 16 detached from the wellhead 12. However, the BOP 16 is attached to the wellhead 12 or other part of the well. A pipe (or tool) 18 is shown traversing the BOP 16 and entering the well 10. The BOP 16 may have two ram blocks 20 attached to corresponding rods 22. Rods 22 move integrally with the ram blocks 20 along directions A and B to close the well 10.

As shown in FIG. 2, the BOP 16 may include, besides the ram block 20 and the rod 22, an extension rod 24 that may be locked by a ram locking mechanism 26. An elastomer 28 is attached to the front side of the ram block 20 such that when the ram block 20 is closed and presses against the pipe 18, it ensures a substantial leakage free contact between the ram block 20 and the pipe 18, i.e., no liquid from below the ram block 20 escapes in the space above the ram block 20.

Extension rod 24 is connected to a piston 30 that is fitted inside an enclosure 32. Piston 30 splits the enclosure 32 into closed chamber 34 and opened chamber 36. FIG. 2 shows the closed chamber 34 having a maximum volume while the opened chamber 36 is squeezed to have a minimum volume and corresponds to a closed position of the ram block 20. When pressure is provided to the opened chamber 36 and the fluid in the closed chamber 34 is vented out, piston 30 moves to the left in FIG. 2, thus moving the ram block 20 to an open position.

The pressure to the opened chamber 36 and the closed chamber 34 is provided from, for example, accumulators 42, which are shown in FIG. 3. FIG. 3 shows a stack 40 of BOPS 16 disposed on top of each other and configured to be mounted with a flange 44 to a wellhead 12 (shown in FIG. 1). Stack 40 also includes, among other things, at least a regulator 46 for adjusting a pressure release by the accumulators 42 to conform to a required pressure for the opened and closed chambers. For example, such a regulator is configured to adjust an input pressure of 5,000 psi to an output pressure of 3,000 psi. As would be appreciated by those skilled in the art, such pressures are large and appropriate structures are provided to withstand such large pressures.

However, during testing of the BOP 16 for closing the ram blocks, when the pressure from accumulators 42 has been released, it has been observed that a component of the regulator 46, which adjusts the pressure and experiences linear motion inside the regulator, significantly oscillates (chatter), which leads to the failure of the regulator. It is observed that either this moving part or a part connected to this moving part fails during the oscillation regime.

The chatter is attributed to the ingress of air (or other fluid that is provided by the accumulator) in the piping of the regulator, which appears to cause excessive flow and instability. As the air compresses and expands, pressure waves are generated that react with the regulator and the regulator compensates those changes in pressure by adjusting a position of a moving part (slide) rapidly. The rapid movement of the regulator causes upstream pressure spikes, which may destroy the regulator slide in a matter of a few seconds in some cases.

Accordingly, it would be desirable to provide systems and methods that effectively overcome the above-noted exemplary problems.

SUMMARY

According to one exemplary embodiment, there is a flow regulator that includes a flow regulating part configured to receive at an inlet a working fluid at a first pressure and to release the working fluid at an outlet at a second pressure, the second pressure being smaller than the first pressure; a slide provided inside the flow regulating part and configured to move along an axis to reduce the pressure of the working fluid from the first pressure to the second pressure; a control part attached to the flow regulating part, the control part including a chamber; a spring housing provided in the chamber and connected to the slide though a shaft, the spring housing configured to move the slide along the axis; a cap provided in the chamber and facing the spring housing, the cap being configured to have plural blind holes; and plural pins extending along the axis and attached to the spring housing, the plural pins being configured to enter the plural blind holes so that a movement of the slide along the axis is damped due to a dampening fluid that is trapped between the blind holes and the pins.

According to another exemplary embodiment, there is a flow regulator that includes a flow regulating part configured to receive at an inlet a working fluid at a first pressure and to release the working fluid at an outlet at a second pressure, the second pressure being smaller than the first pressure; a slide provided inside the flow regulating part and configured to move along an axis to reduce the pressure of the working fluid from the first pressure to the second pressure; a control part attached to the flow regulating part, the control part including a chamber; a spring housing provided in the chamber and connected to the slide though a shaft, the spring housing configured to move the slide along the axis; and at least one pin fixedly connected to a protrusion of the flow regulating part and configured to enter a blind hole formed in the slide such that the working fluid is trapped between the blind hole and the at least one pin.

According to still another exemplary embodiment, there is a blowout preventer stack that includes a frame; at least an accumulator attached to the frame and configured to provide a working fluid under pressure; a blowout preventer fluidly connected to the accumulator and configured to close a well when the working fluid is provided to the blowout preventer; and a flow regulator interposed between the accumulator and the blowout preventer and configured to reduce a first pressure of the working fluid from the accumulator to a second pressure to be provided to the blowout preventer. The flow regulator includes a flow regulating part configured to receive at an inlet the working fluid at the first pressure and to release the working fluid at an outlet at the second pressure, a slide provided inside the flow regulating device and configured to move along an axis to reduce the pressure of the working fluid from the first pressure to the second pressure, a control part attached to the flow regulating part, the control part including a chamber, a spring housing provided in the chamber and connected to the slide though a shaft, the spring housing configured to move the slide along the axis, a cap provided in the chamber and facing the spring housing, the cap being configured to have plural blind holes, and plural pins extending along the axis and attached to the spring housing, the plural pins being configured to enter the plural blind holes so that a movement of the slide along the axis is damped due to a dampening fluid that is trapped between the plural blind holes and the plural pins.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 is an isomeric view of a flow regulator according to an exemplary embodiment;

FIG. 5 is a schematic diagram of a flow regulator according to an exemplary embodiment;

DETAILED DESCRIPTION

Figure 1:
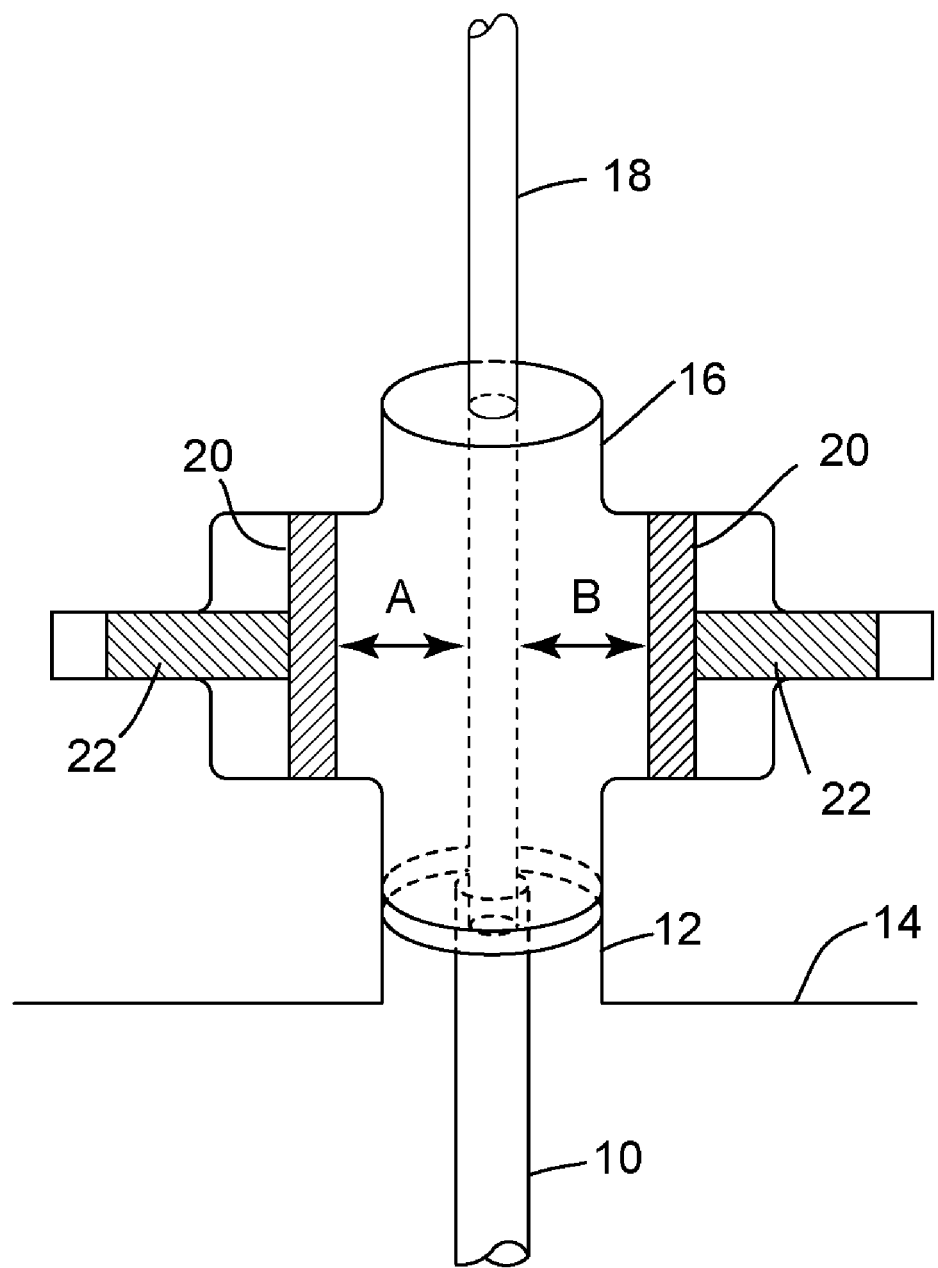
FIG. 1 is a schematic diagram of a conventional ram BOP.
Figure 2:
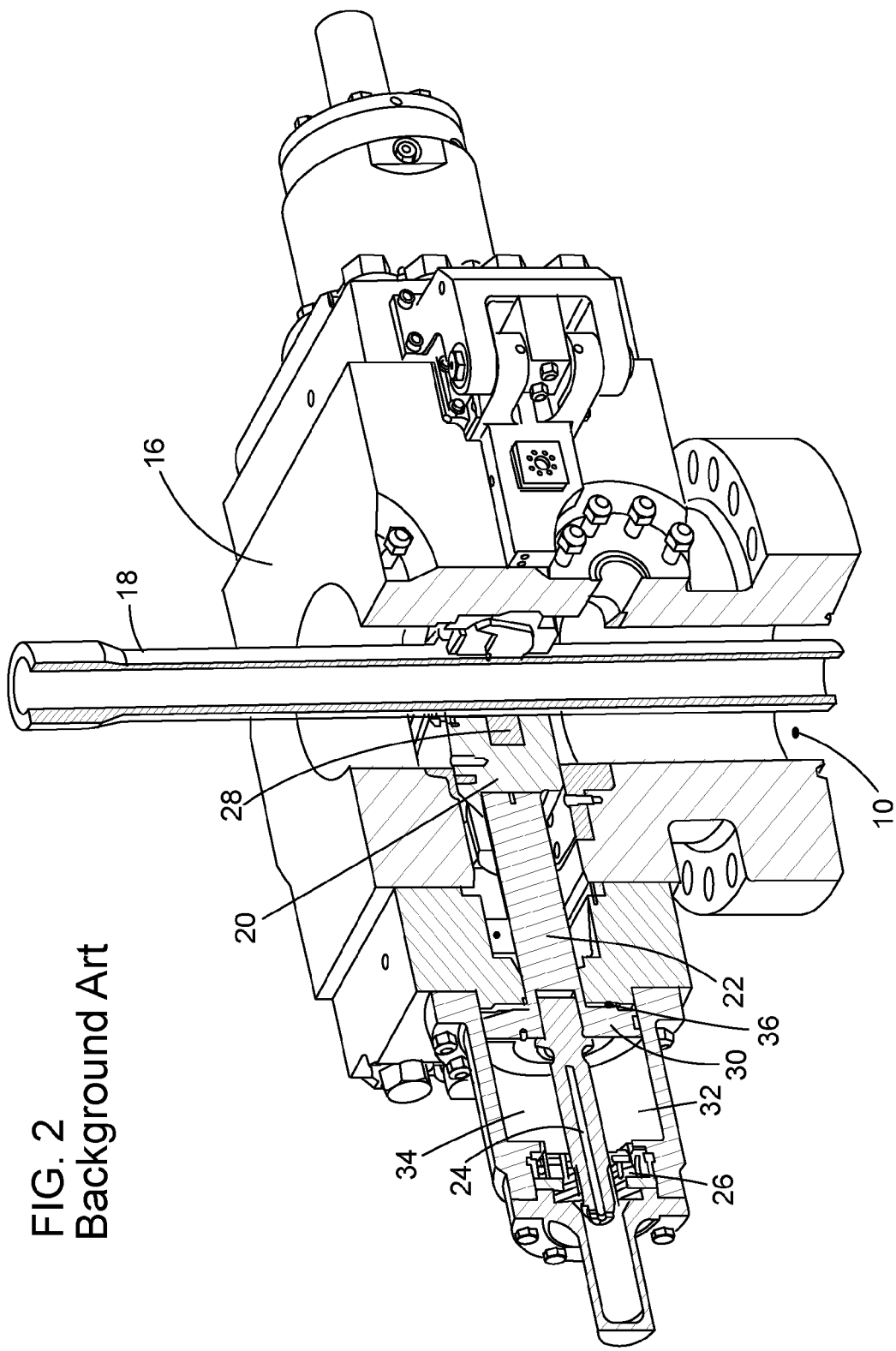
FIG. 2 is a more detailed diagram of a conventional ram BOP.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a pressure regulator. However, the embodiments to be discussed next are not limited to these systems, but may be applied to other systems that adjust a pressure of a passing fluid.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a flow regulator is provided with pins and corresponding blind holes such that the pins trap a fluid inside the blind holes and squeeze the fluid while attenuating an oscillatory motion (chatter) that may appear in parts of the flow regulator.

As shown in FIG. 4, in accordance with an exemplary embodiment, a flow regulator 50 includes a flow regulating part 52 and a control part 54 that controls the fluid flow. The flow regulating part 52 is configured to regulate a pressure of a working fluid while the control part may include a dampening fluid that is insulated from the working fluid. In one application, the flow regulator 50 may provide an output pressure between 1000 to 3000 psi for an input pressure of 5000 psi. FIG. 4 shows an isomeric view of the flow regulator 50. A more detailed view of the flow regulator is shown in FIG. 5. In this figure, the flow regulating part 52 is shown having a slide 60 configured to move along an axis 62. The slide 60 has a hole 64 that places in flow communication, when in the appropriate position, an input 66 and an output 68 of the flow regulator 50.

Figure 3:
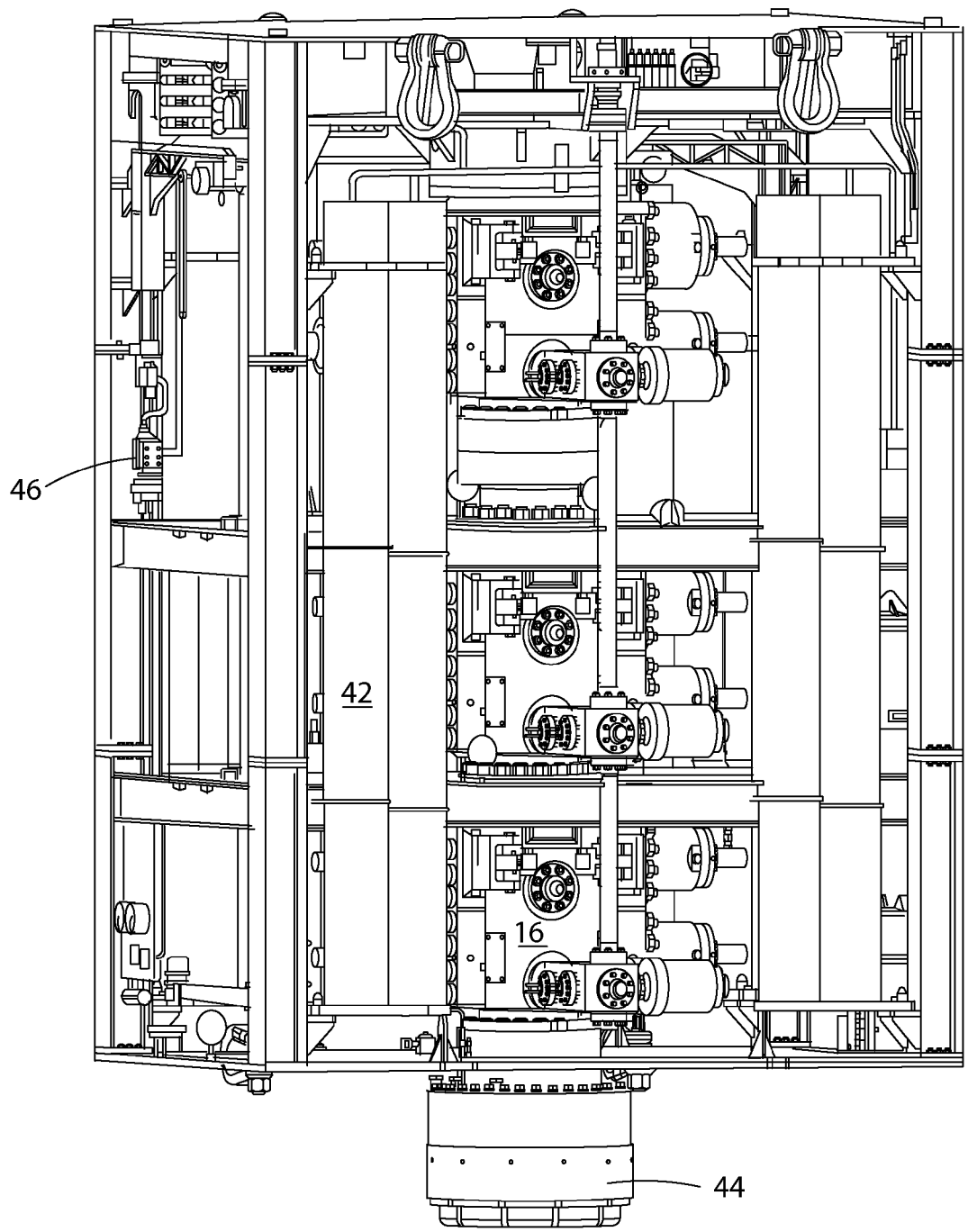
FIG. 3 is a schematic diagram of a BOP stack.

The slide 60 is provided inside the flow regulating part 52 and is configured to receive the working fluid, for example, the fluid under pressure from accumulator 42 shown in FIG. 3. The flow regulating part 52 is also referred to as the hydraulic part. The flow regulating part 52 is fluidly insulated from the control part 54. A movement from the flow regulating part 52 is transmitted to the control part 54 by a shaft 70, which is configured to move along axis 62 into the control part 54. The shaft 70 is connected to a spring housing 72 of the control part 54 via a bolt 74. In another exemplary embodiment, the shaft 70 may be connected through other means to the spring housing 72, for example, welding. The spring housing 72 is provided into a chamber 76 of the control part 54. The slide 60, shaft 70, and spring housing 72 may be made of steel or another strong material.

In one exemplary embodiment, slide 60 is connected to shaft 70 by a bolt 78. However, as will be discussed later, the slide 60 may be removably attached to the shaft 70. The spring housing 72 is configured to move along axis 62. The spring housing 72 may include one or more pins 80. Pins 80 are fixedly attached to the spring housing 72. A cap 82 is also provided inside chamber 76, at a side of the chamber 76 opposite to a side that is adjacent to the flow regulating part 52. Cap 82 is fixed in position by a positioning element 84. In one application, the cap 82 is fixed to the positioning element 84 by a bolt 86. Positioning element 84 may be adjusted along axis 62 such that a position of the cap 82 inside chamber 76 is adjusted as desired.

Figure 6:
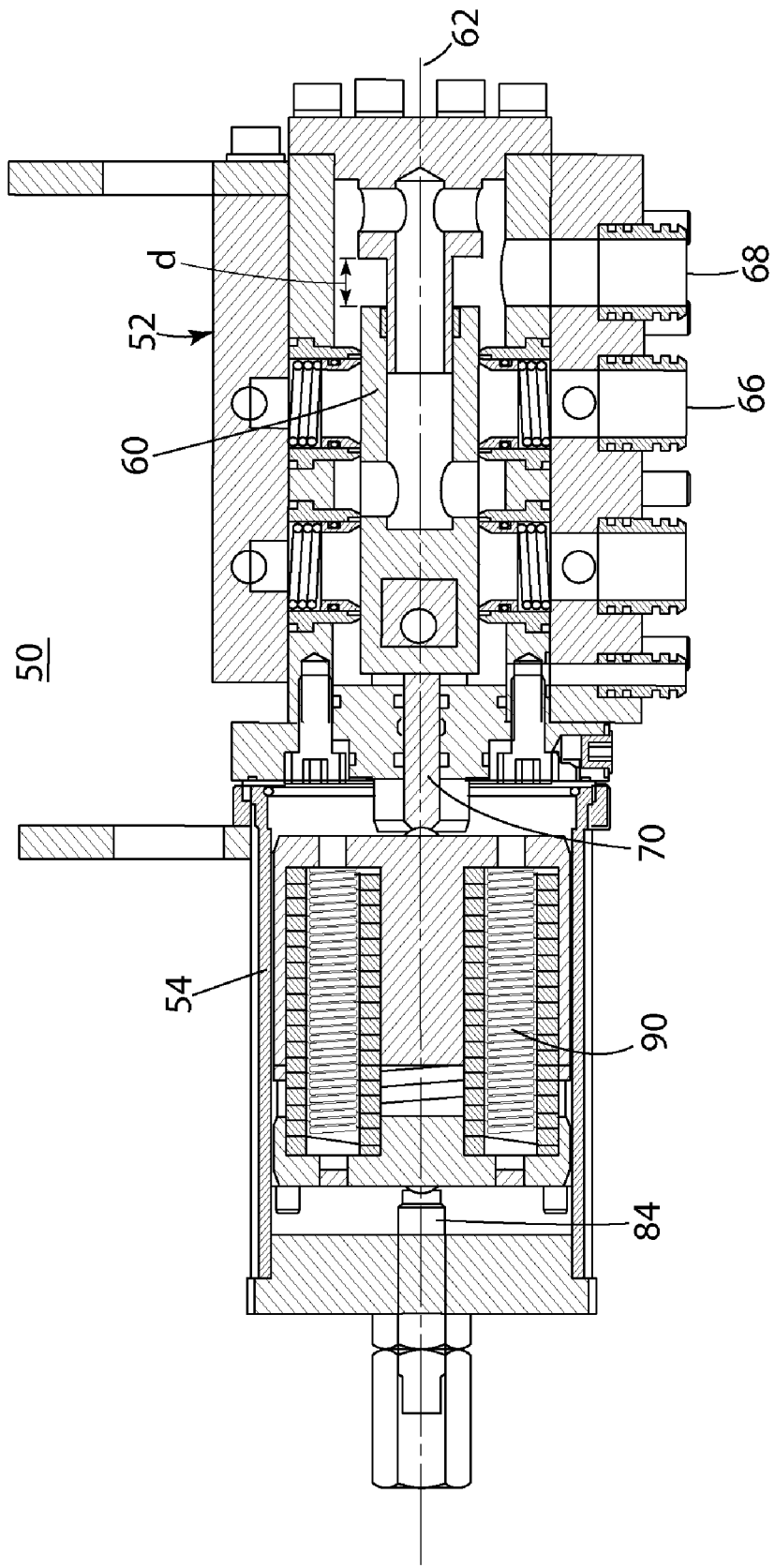
FIG. 6 is a schematic diagram of a transversal view of a flow regulator according to an exemplary embodiment.

One or more springs 90 are provided between cap 82 and the spring housing 72 such that, when no pressure is applied to the inlet 66, the spring 90 biases the spring housing 72, shaft 70 and slide 60 so that fluid communication is allowed between input 66 and output 68. However, when high pressure is applied at output 68, the slide 60 moves to the left in FIG. 5, compressing the spring 90. This position is shown in FIG. 6, where slide 60 has moved a distance d along axis 62. FIGS. 5 and 6 illustrate different views of a same flow dampening device.

According to an exemplary embodiment, springs 90 may be selected such that a spring force provided on shaft 70 via spring housing 72 is balanced by a force applied by the working fluid acting on slide 60, when the pressure of the working fluid is 3000 psi. When the pressure of the working fluid increases above 3000 psi, the force exerted by the working fluid on the shaft 70 is larger than the force exerted by the springs 90 on the shaft 70, and thus shaft 70 moves the distance "d" to the left along axis 62, closing the working fluid flow through slide 60, as shown in FIG. 6. When the pressure in the working fluid at outlet 68 decreases below 3000 psi, the force produced by the springs 90 on the shaft 70 overcomes the force produced by the working fluid on the shaft 70, consequently causing a movement of the slide 60 to the right, as shown in FIG. 5, which opens the working fluid flow.

Still with regard to FIG. 5, it is noted that cap 82 includes blind holes 94 that match pins 80. Blind holes 94 are defined as having an open end 94a, that is freely to communicate with the chamber 76 when pins 80 are not inside the blind holes and another end 94b, which is permanently closed. In this way, a dampening fluid that is present in the chamber 76, for example, a mineral oil, may be trapped inside the blind hole 94 when a corresponding piston 80 is entering the blind hole. In this way, assuming that there is a sudden oscillation (chatter) of the slide 60 as discussed in the Background Section, this oscillation is dampened by the combination of the dampening fluid being trapped inside the blind hole 94, the pin 80 compressing the dampening fluid inside the blind hole 94 and an internal diameter of the blind hole 94 closely matching an external diameter of the pin 80 such that a limited amount of dampening fluid escapes outside the blind hole 94 past the pin 80. In other words, the oscillations of the slide 60 are dampened by the blind hole 94, pin 80 and dampening fluid between them. The blind hole 94, the pin 80 and the dampening fluid act as a dampening device. The number of the blind holes and corresponding pins depends from application to application.

In one exemplary embodiment, the pin 80 is manufactured to tightly fit inside the blind hole 94, for example, with a tolerance in the order of thousandths of an inch. According to an exemplary embodiment, a seal 98 may be formed between the pin 80 and the blind hole 94 to control the leakage flow rate of the dampening fluid from the blind hole 94. Seal 98 may be formed to partially or completely encircle pin 80. FIG. 5 shows seal 98 partially encircling pin 80.

Figure 7:
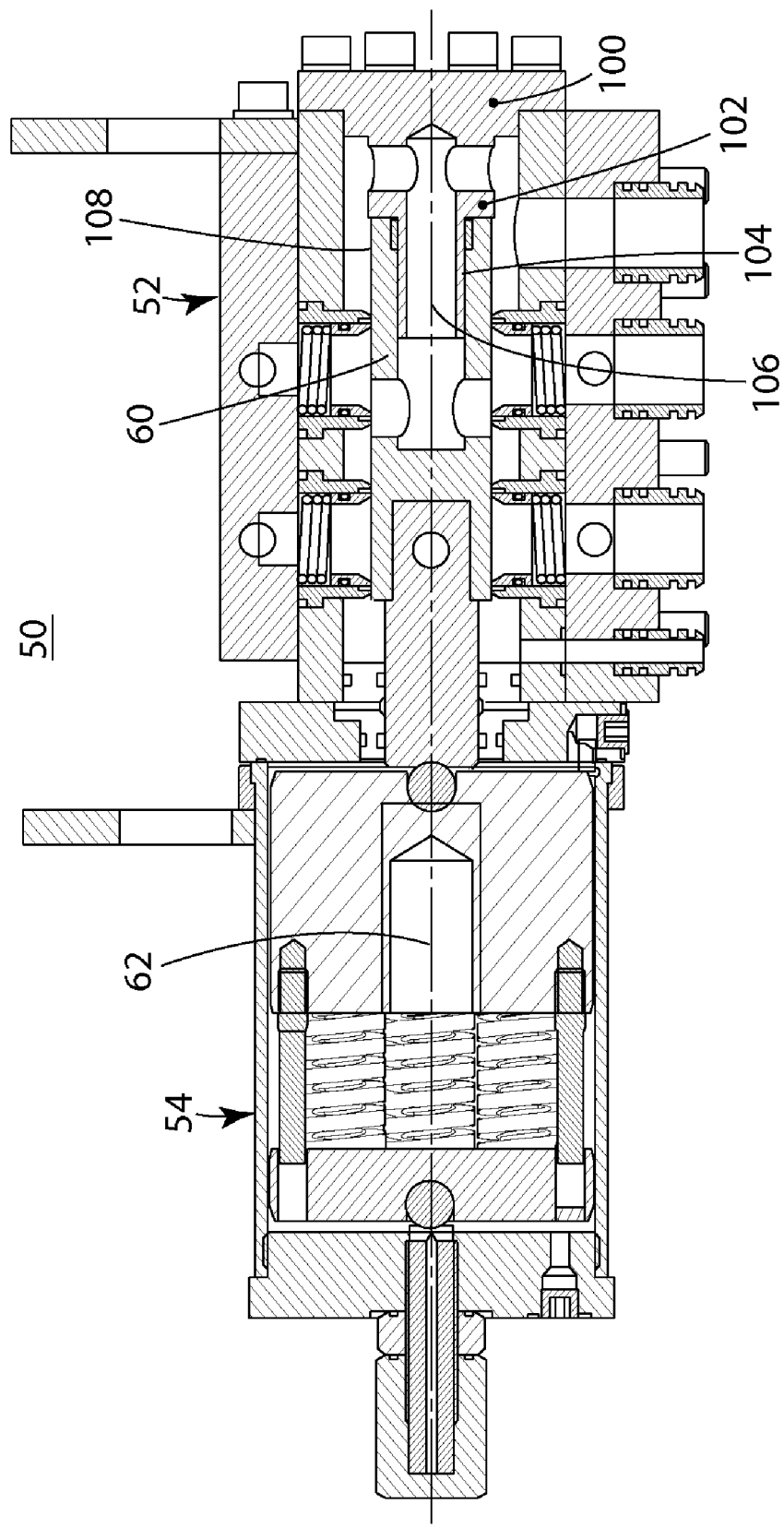
FIG. 7 is a schematic diagram of a transversal view of a flow regulator according to an exemplary embodiment.

According to another exemplary embodiment shown in FIG. 7, a dampening mechanism is formed between slide 60 and a component 100 of the flow regulating part 52. Component 100 forms a side of the flow regulating part 52 and has a protrusion 102 that extends along axis 62, towards the control part 54. The protrusion 102 ends with a hollow element 104, that forms a channel 106. Slide 60 has a sleeve part 108 that is configured to contact the hollow element 104 and to extend channel 106. A detailed view of the sleeve part 108, protrusion 102 and hollow element 104 is shown in FIG. 8.

Figure 8:
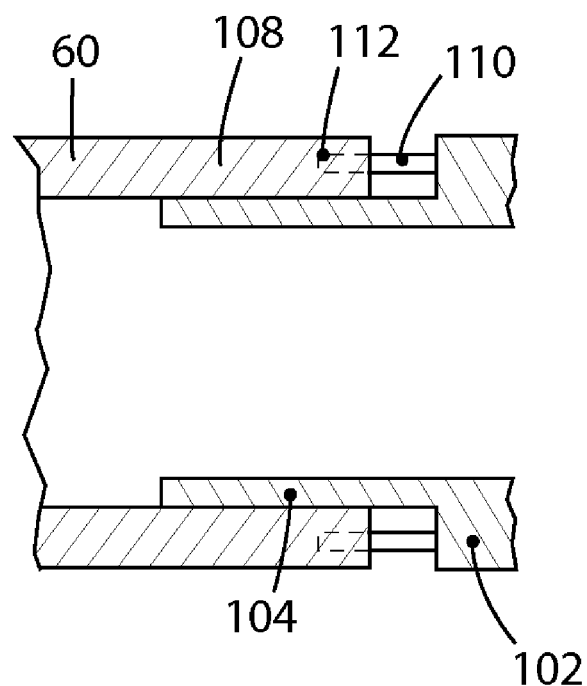
FIG. 8 is a schematic diagram of a slide of a flow regulator according to an exemplary embodiment.

FIG. 8 illustrates an embodiment in which the protrusion 102 includes at least one pin 110 that is configured to enter a matching blind hole 112 of the sleeve part 108. The at least one pin 110 is attached to the protrusion 102 while the blind hole 112 is formed in the sleeve part 108 of the slide 60. In one application, the hole may be formed in the protrusion 102 and the pin may be attached to sleeve part 108. The working fluid may be trapped inside the blind hole 112 while the pin 110 of the protrusion 102 may be compressing the working fluid. The blind hole 112, the pin 110 and the working fluid dampen a motion of the slide 60 similar to the blind hole 94, pin 80 and the dampening fluid. Thus, the functional description of this dampening mechanism is omitted as being similar to the one discussed above.

Figure 9:
FIG. 9 is a schematic diagram of a pin entering a slide of a flow regulator according to an exemplary embodiment.

Pin 110 may have a smooth surface but a small tolerance with respect to the blind hole 112 such that a limited amount of working fluid leaks from the blind hole 112 when compressed by pin 110. In another exemplary embodiment, the pin 110 may have a grooved seal 114 formed in its surface to prevent the above mentioned leakage. FIG. 9 shows such a profile for pin 110 with grooved seal 114.

The dampening mechanism of FIG. 8 may be used without the dampening mechanism of FIG. 5 and vice versa. In one exemplary embodiment, the two dampening mechanisms may be used together to prevent a failure of the slide due to chatter or other oscillations.

The disclosed exemplary embodiments provide a regulator dampening device and a method for reducing chatter in a movable slide inside the regulator. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other example are intended to be within the scope of the claims.

What is claimed is:
1. A flow regulator, comprising:
a flow regulating part configured to receive at an inlet a working fluid at a first pressure and to release the working fluid at an outlet at a second pressure, the second pressure being smaller than the first pressure;
a slide provided inside the flow regulating part and configured to move along an axis to reduce the pressure of the working fluid from the first pressure to the second pressure;
a control part attached to the flow regulating part, the control part including a chamber;

a spring housing provided in the chamber and connected to the slide through a shaft, the spring housing being biased by at least one spring move the slide along the axis;

a cap provided in the chamber and facing the spring housing, the cap including plural blind holes; and plural pins extending along the axis and attached to the spring housing, the plural pins being configured to enter the plural blind holes so that a movement of the slide along the axis is damped by a dampening fluid disposed between the plural blind holes and the plural pins.

2. The flow regulator of claim 1, further comprising:
a positioning element attached to an end of the chamber to face the cap, the positioning element being configured to fix a position of the cap inside the chamber.

3. The flow regulator of claim 1, wherein: the at least one spring comprises
plural springs between the cap and the spring housing configured to bias the spring housing towards the slide.

4. The flow regulator of claim 1, wherein the control part is configured to receive only the working fluid and the flow regulating part is configured to receive only the dampening fluid, the dampening fluid being different from the working fluid.

5. The flow regulator of claim 1, wherein the shaft is fixedly connected to the slide and to the spring housing.

6. The flow regulator of claim 1, further comprising:
at least one seal provided for each pin of the plural pins to slow a release of the trapped working fluid from the respective blind hole when the corresponding pin moves inside the respective blind hole.

7. The flow regulator of claim 1, wherein an outside diameter of the plural pins is within about a thousandth of an inch of an inside diameter of the plural blind holes.

8. The flow regulator of claim 1, wherein the slide comprises:
at least one pin fixedly connected to a protrusion of the flow regulating part and configured to enter a blind hole formed in the slide such that the working fluid is trapped between the blind hole and the at least one pin.

9. The flow regulator of claim 8, wherein the at least one pin has a smooth surface.

10. The flow regulator of claim 8, wherein the at least one pin has a seal grooved into a surface of the at least one pin to minimize a flow of working fluid from the blind hole.

11. A flow regulator, comprising:
a flow regulating part configured to receive at an inlet a working fluid at a first pressure and to release the working fluid at an outlet at a second pressure, the second pressure being smaller than the first pressure;

a slide provided inside the flow regulating part and configured to move along an axis to reduce the pressure of the working fluid from the first pressure to the second pressure;

a control part attached to the flow regulating part, the control part including a chamber;

a spring housing provided in the chamber and connected to the slide though a shaft, the spring housing being biased by at least one spring move the slide along the axis; and at least one pin fixedly connected to a protrusion of the flow regulating part and configured to enter a blind hole formed in the slide such that the working fluid is trapped between the blind hole and the at least one pin.

12. The flow regulator of claim 11, wherein the at least one pin has a smooth surface.

13. The flow regulator of claim 11, wherein the at least one pin has a seal grooved into a surface of the at least one pin to minimize a flow of working fluid from the blind hole.

14. The flow regulator of claim 11, further comprising:
a cap provided in the chamber and facing the spring housing, the cap being configured to have plural blind holes; and plural pins extending along the axis and attached to the spring housing, the plural pins being configured to enter the plural blind holes so that a movement of the slide along the axis is damped due to a dampening fluid that is trapped between the plural blind holes and the plural pins.

15. The flow regulator of claim 14, further comprising:
a positioning element attached to an end of the chamber to face the cap, the positioning element being configured to fix a position of the cap inside the chamber.

16. The flow regulator of claim 14, wherein: the at least one spring comprises
plural springs provided between the cap and the spring housing and configured to bias the spring housing towards the slide.

17. The flow regulator of claim 14, wherein the control part is configured to receive only the dampening fluid and the flow regulating part is configured to receive only the working fluid, the working fluid being different from the dampening fluid.

18. The flow regulator of claim 14, further comprising:
at least one seal provided for each pin of the plural pins to slow a release of the trapped dampening fluid from the corresponding blind hole when the corresponding pin moves inside the corresponding blind hole.

19. A blowout preventer stack, comprising:
a frame;
at least an accumulator attached to the frame and configured to provide a working fluid under pressure;
a blowout preventer fluidly connected to the accumulator and configured to close a well when the working fluid is provided to the blowout preventer; and
a flow regulator interposed between the accumulator and the blowout preventer and configured to reduce a first pressure of the working fluid from the accumulator to a second pressure to be provided to the blowout preventer,
wherein the flow regulator includes,
a flow regulating part configured to receive at an inlet the working fluid at the first pressure and to release the working fluid at an outlet at the second pressure,
a slide provided inside the flow regulating part and configured to move along an axis to reduce the pressure of the working fluid from the first pressure to the second pressure,
a control part attached to the flow regulating part, the control part including a chamber,
a spring housing provided in the chamber and connected to the slide though a shaft, the spring housing being biased by at least one spring move the slide along the axis,
a cap provided in the chamber and facing the spring housing, the cap being configured to have plural blind holes, and
plural pins extending along the axis and attached to the spring housing, the plural pins being configured to enter the plural blind holes so that a movement of the slide along the axis is damped due to a dampening fluid provided between the plural blind holes and the plural pins.

20. The blowout preventer stack of claim 19, further comprising:
at least one pin fixedly connected to a protrusion of the flow regulating part and configured to enter a blind hole formed in the slide such that the working fluid is trapped between the blind hole and the at least one pin.

* * * * *